Patented Nov. 28, 1950

2,531,662

UNITED STATES PATENT OFFICE 2,531,662

DRILLING FLUIDS

Robert W. Beck, Tulsa, Okla., assignor to Stanolind Oil and Gas Company, Tulsa, Okla., a corporation of Delaware No Drawing. Application January 18, 1947,
Serial No. 722,953

3 Claims. (Cl. 252—8.5)

This invention relates to methods of drilling wells and more particularly to lightweight drilling fluids.

In drilling wells by the rotary method it is customary to circulate a fluid down the drill pipe and up the annular space around the pipe to carry out bit cuttings, lubricate the bit and the drill pipe in the hole, cool the bit, and prevent high pressures in some formations from blowing out through the well. In some operations in wells the principal problem is to prevent the weight of mud from overbalancing formation pressures. One example of such operations is drilling in creviced, porous, or cavernous formations where overbalancing of formation pressures results in loss of large volumes of drilling fluid to the crevices, pores, and caverns. Other examples of such operations are working-over and completing wells in oil-producing formations with low formation pressures, where overbalancing of formation pressures results in entry of water into the formations whereby shale particles in the formations are caused to swell and block subsequent flow of oil into the wells.

The drilling fluids should be non-inflammable, of light weight, of low viscosity, and of high stability. Heretofore attempts have been made to produce a lightweight drilling fluid by adding crude oil to aqueous muds whereby the density of the muds is decreased. Quantities of crude oil up to 20 or 25 per cent can usually be added to aqueous muds without difficulty, but if greater reduction in density is desired the addition of crude oil in amounts greater than 25 per cent usually results in a viscosity which is so high that the pumps are unable to circulate the mud in a well. This viscosity limitation on the quantity of oil which can be added is objectionable because it is usually required to add considerably more than 25 per cent oil if the desired reduction in density is to be obtained. Other objections to mixtures of aqueous muds and wide-boiling-range crude oils include the fire hazard and the relatively small reduction in density due to the high-density portions of the wide-boiling-range fractions. Likewise, it has been found that emulsions of crude oil in water or muds are frequently unstable.

The mere addition of a selected narrow-boiling-range fraction, such as kerosene, of refined petroleum, however, does not necessarily produce a stable lightweight mud. Refined petroleum fractions such as kerosene do not tend to become so finely dispersed in aqueous muds and may be unstable. Much of the stability of emulsions of crude oil in water or mud appears to be due to the presence of the natural emulsifying agents in the crude oil. However, as pointed out above, these dispersions, if they contain approximately equal quantities of oil and water usually are highly viscous. Since these emulsifying agents are not present to an appreciable extent in petroleum fractions such as kerosene, the dispersed droplets of the petroleum fraction may coalesce and separate from the aqueous phase.

It is, therefore, a principal object of this invention to provide a stable lightweight drilling mud for use in wells. Another object of this invention is to provide a lightweight drilling fluid of the emulsion type which has a low viscosity. A further object of the invention is to provide stable dispersions of a lightweight water-insoluble liquid in aqueous mud as a lightweight drilling fluid. Still another object of the invention is to provide a non-inflammable lightweight drilling fluid including substantial proportions of non-aqueous liquids. These and other objects of the invention will become apparent as my description thereof proceeds.

Broadly, I have provided a low-viscosity, stable, lightweight, non-inflammable drilling fluid by dispersing a refined petroleum fraction in an aqueous mud having certain gel-strength characteristics. These suspensions are stable even at elevated temperatures and are of low viscosity and density.

Muds are not true fluids but have many properties of solids, particularly when the muds are not in motion. That is, if a mud is permitted to remain quiescent for a short time, a gel forms, and this gel has a measurable shear strength. This shear strength must be exceeded before the mud will flow; and, likewise, if the forces tending to cause the droplets of the petroleum fraction to flow through the mud and coalesce are insufficient to overcome this shear strength, the droplets will not coalesce but will remain dispersed in the aqueous phase as a stable suspension. When the suspension is agitated and turbulent, the droplets are maintained in a dispersed state; and, when the suspension is not in motion, gel strength will develop in the aqueous mud and prevent coalescense of the droplets. It should be understood that I do not wish to be limited in any way by the above theory. Whatever the theory, however, I have found that a low-viscosity, stable, lightweight, non-inflammable drilling fluid can be formed by dispersing a refined petroleum fraction in an aqueous mud, provided that the gel strength of the mud is above a defined critical value as described hereinafter.

One method for defining the gel strength of the aqueous mud is in terms of the so-called 10-minute-gel-strength test. I have found that this test is a reliable means for determining whether the gel strength of an aqueous mud is sufficient to maintain the droplets of a petroleum fraction in a dispersed state. In this test the mud sample is stirred vigorously, poured into a Stormer viscosimeter cup, allowed to stand 10 minutes while gel strength develops and the weight necessary to cause the rotor just to begin to move is determined. This weight is commonly known as the 10-minute gel strength of the mud.

A slurry of 2 per cent by weight of bentonite in water has a 10-minute gel strength of about 1.4 grams according to this test. A 3 per cent by weight bentonite-in-water slurry has a 10-minute gel strength of about 3.2 grams. The 2 per cent bentonite slurry does not form a stable suspension when mixed with an equal volume of kerosene, whereas the 3 per cent bentonite slurry forms a very satisfactory stable suspension when mixed with an equal volume of kerosene. In general, a mud should have a 10-minute gel strength of at least about 3 grams in order to insure stability. Although a gel strength of 3 grams is adequate to maintain a stable suspension, I prefer in most instances a mud having a gel strength of the order of about 5 grams or greater for preparing suspensions for field operations.

Several characteristics may be made the basis for selecting a satisfactory refined petroleum fraction. If non-inflammability is relatively unimportant compared to low density, a fraction as light as gasoline may be employed. For most operations, however, the petroleum fraction should have a flash point of at least 120° F. In order to obtain an appreciable reduction in the density of the aqueous mud, it is desirable to use a petroleum fraction having a density of less than 0.90 gram per cc. If desirable from the standpoint of availability, cost, or the like, however, use of a petroleum fraction having a density as high as 1.00 gram per cc. may sometimes produce a suspension of the required density. An upper density limit of 0.90 gram per cc. is preferred, however, not only to obtain a suspension of lower density, but also to reduce the danger that such a petroleum fraction may not have been distilled and may therefore contain emulsifying agents which will cause the suspension to have an excessively high viscosity. One of the most certain tests is whether the fraction has been distilled, since distilled fractions generally are free from emulsifying agents. If further certainty of a low-viscosity suspension is desired, only petroleum fractions having a 90 per cent point of less than 600° F. in the A. P. I. distillation should be used.

It is necessary to have such criteria of the constituents of the lightweight mud so that a suitable lightweight suspension can be produced and its properties predicted before adding the petroleum fraction to the mud suspension. To assure the stability of the lightweight drilling fluid, an aqueous mud having a 10-minute gel strength of at least 3 grams and preferably of at least 5 grams should be employed. To maintain the viscosity within low limits of between about 10 and about 80, a distilled petroleum fraction having a density of less than 0.90 gram per cc and a 90 per cent point of less than 600° F. in the A. P. I. distillation should be used. To produce a lightweight drilling mud which is substantially non-inflammable under operating conditions, the petroleum fraction should have a flash point of at least 120° F. An example of such a petroleum fraction is kerosene, but many other fractions fall within the general characteristics. For example, refined petroleum fractions such as naphthas, stove oil, diesel oil, or the like, including many cleaners' naphthas and paint thinners, may be used. Some fuel oils are satisfactory, and most diesel oils are operable and are often readily available at the well-drilling site.

A particularly useful lightweight drilling fluid comprises about 50 parts of kerosene and about 50 parts of mud. In general, the proportion of the petroleum fraction should not exceed about 60 parts by volume to 40 parts by volume of mud.

If the mud itself is highly viscous or contains emulsifiers, the suspension of a refined petroleum fraction in the mud will probably be highly viscous. I have found that the use of viscosity reducers such as sodium acid pyrophosphate may be used to effect a reduction in the viscosities of these emulsions when they are due to the emulsifying characteristics of the mud. Sodium acid pyrophosphate is of course, only one example of well-known viscosity reducers for clay-base muds, and other materials may be substituted. One of the advantages of the lightweight suspension described herein is that all the properties excepting density can be controlled principally by the characteristics of the aqueous mud. For example, viscosity reducers, such as sodium acid pyrophosphate, or fluid-loss reducers, such as starch, which are effective when used with aqueous muds usually are also effective when used in my lightweight suspension including refined petroleum fractions dispersed in an aqueous mud of suitable gel strength.

From the above it will be apparent that I have attained the objects of my invention and have provided a lightweight drilling fluid of low viscosity and high stability. It should be understood, however, that although my invention has been described hereinabove with reference to particular embodiments thereto it is contemplated that modifications may be made without departing from the scope of the invention as defined by the appended claims. It is contemplated, for example, that other water-insoluble, lightweight, non-emulsifying liquids can in some instances be substituted for the refined petroleum fractions and that muds other than pure bentonite or clay slurries can be used in producing stable, lightweight, non-inflammable low-viscosity suspensions suitable for use as drilling fluids.

I claim:

1. A low-viscosity, stable, light-weight, drilling fluid which consists essentially of about 25 to 60 volume per cent of a distillate petroleum oil boiling in the naphtha to diesel oil boiling range dispersed in about 75 to 40 volume per cent of an aqueous mud containing sufficient gel forming clay to have a 10 minute gel strength of at least 3 grams.

2. The drilling fluid of claim 1 in which the oil is kerosene and the clay is bentonite.

3. The drilling fluid of claim 2 wherein the gel strength is about 5 grams.

ROBERT W. BECK.

REFERENCES CITED

The following references are of record in the file of this patent:

UNITED STATES PATENTS

| Number | Name | Date |
| --- | --- | --- |
| 1,517,577 | Olsson | Dec. 2, 1924 |
| 1,758,265 | Sherrick | May 13, 1930 |
| 2,055,666 | Moore et al. | Sept. 29, 1936 |
| 2,099,825 | Rolshausen et al. | Nov. 23, 1937 |
| 2,151,029 | Henst | Mar. 21, 1939 |
| 2,216,955 | Moore | Oct. 8, 1940 |
| 2,317,038 | Ellinger | Apr. 20, 1943 |
| 2,360,992 | Weiss | Oct. 24, 1944 |

FOREIGN PATENTS

| Number | Country | Date |
| --- | --- | --- |
| 629,755 | Germany | May 9, 1936 |